United States Patent [19]

Olsen et al.

[11] 4,392,655
[45] Jul. 12, 1983

[54] HIGH-PRESSURE SEAL WITH CONTROLLED DEFLECTION UNDER PRESSURE

[75] Inventors: John H. Olsen, Vashon; Robert S. Pritchard, Seattle, both of Wash.

[73] Assignee: Flow Industries, Inc., So. Kent, Wash.

[21] Appl. No.: 188,980

[22] Filed: Sep. 19, 1980

[51] Int. Cl.³ .................... F16J 15/48; F16J 15/40
[52] U.S. Cl. ................................ 277/1; 277/27; 277/135; 277/236
[58] Field of Search ............. 277/1, 3, 27, 236, 237, 277/170–172, 138, 13, 14 R, 14 V, 135

[56] References Cited

U.S. PATENT DOCUMENTS

| | | |
|---|---|---|
| 324,776 | 8/1885 | Killmer . |
| 1,345,555 | 7/1920 | Sargent . |
| 2,369,883 | 2/1945 | Coopey ............................ 277/135 X |
| 2,664,261 | 12/1953 | Stephany . |
| 2,813,588 | 11/1957 | O'Reilly . |
| 2,930,608 | 3/1960 | Hogan et al. ..................... 277/27 X |
| 3,128,133 | 4/1964 | Audemar .......................... 277/27 X |
| 3,164,390 | 1/1965 | Miller ............................... 277/236 X |
| 3,471,157 | 10/1969 | Swearingen ...................... 277/135 X |
| 3,602,520 | 8/1971 | Wallis ............................... 277/27 |
| 4,026,562 | 5/1977 | Sparrow ............................ 277/1 |

FOREIGN PATENT DOCUMENTS

| | | | |
|---|---|---|---|
| 1406843 | 6/1965 | France .............................. 277/27 |
| 396061 | 7/1933 | United Kingdom .............. 277/27 |

OTHER PUBLICATIONS

"How To Pack Reciprocating Rods Against High Pressures," W. Coopey, *Chemical Engineering* (periodical), issue of Nov. 1951, pp. 164–166.

*Primary Examiner*—Robert S. Ward, Jr.
*Attorney, Agent, or Firm*—Don R. Mollick; David M. Deits; Gregory W. Moravan

[57] ABSTRACT

A seal for a movable shaft which extends from a cavity within a high-pressure vessel maintains a uniform gap between the shaft and the seal body at high pressures to form an effective seal while providing adequate clearance between the shaft and the seal body to prevent excessive wear.

21 Claims, 4 Drawing Figures

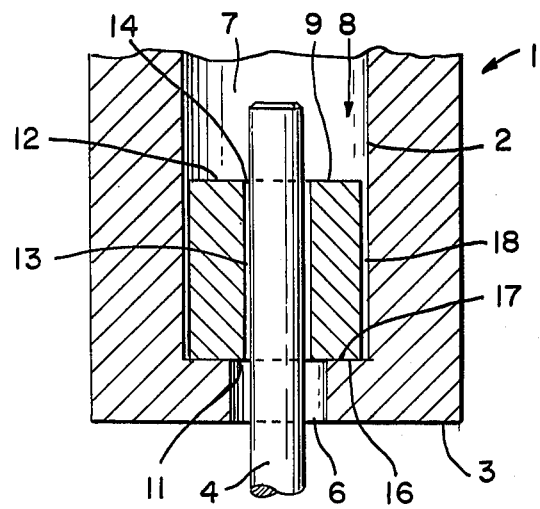
FIG. 1
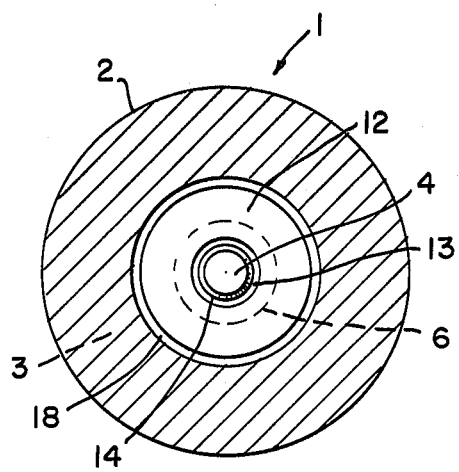
FIG. 2
FIG. 3
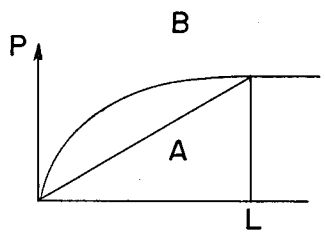
FIG. 4
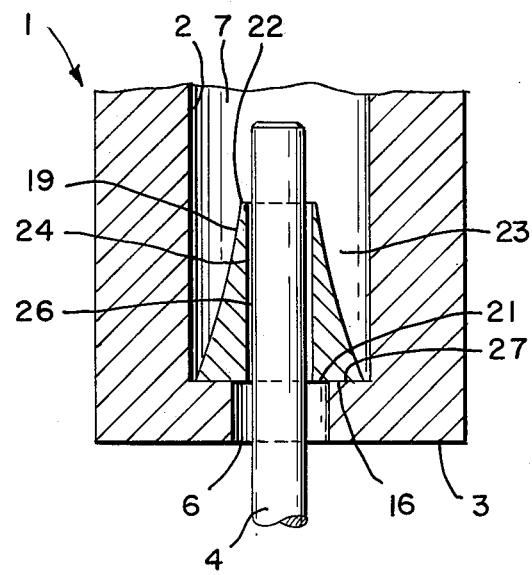

HIGH-PRESSURE SEAL WITH CONTROLLED DEFLECTION UNDER PRESSURE

BACKGROUND OF THE INVENTION

1. Field of the Invention

The present invention relates generally to seals and more particularly to seals for rotatable or reciprocable elements which extend from a region of high fluid pressure to a region of low fluid pressure.

2. Description of the Prior Art

Forming a pressure-tight joint between a high-pressure vessel and the atmosphere when a moving element, such as a piston or rotatable shaft must be in communication with the atmosphere is one of the most difficult problems encountered by industries utilizing high-pressure fluids. There are two conventional types of seals for reciprocable and rotatable shafts. One conventional seal comprises a seal material which rubs against the shaft to prevent liquid from passing between the interface of the shaft and the seal. The sealing force increases as the pressure increases, which, at high pressures, results in excessive wear of both the shaft and seal. The other conventional seal has a small clearance between the shaft and the seal material to maintain an acceptable leakage rate between the shaft and seal. At high pressures the clearance increases due to a lack of rigidity of the seal material, which allows the leakage rate to increase beyond acceptable limits.

Accordingly, the art exhibits a need for a durable, low-cost seal for moving elements which extend from a high-pressure region to a low-pressure region.

SUMMARY OF THE INVENTION

The present invention provides a seal for high-pressure applications, such as in pumps and rotary joints. A seal according to the present invention includes a clearance seal which permits either axial motion or rotational motion of a shaft which extends from a region of high fluid pressure to a region of low fluid pressure while allowing acceptable leakage. The seal surrounds a shaft with a predetermined gap provided between the seal body and the shaft at low-pressures. The seal body configuration is such that at working pressures, high-pressure fluid radially compresses the seal to provide a gap having a substantially uniform width along the length of the seal. The width of the gap at operating pressures is sufficient to prevent direct contact between the shaft and the seal while maintaining an acceptable leakage rate. Since there is clearance between the shaft and the seal, the present invention provides a seal which has a lower rate of wear than conventional seals; and the closing of the clearance with pressure, rather than opening, as in conventional designs, minimizes leakage at operating pressures.

A seal according to the present invention also includes a compression seal to control leakage between an end of the seal body and the wall which separates the high and low pressure regions. The high pressure fluid acts on an end of the seal body to cause a sealing force thereon. The seal body transmits the sealing force to a compression seal area which is less than the area upon which the fluid pressure acts, thereby causing the compression sealing pressure to be greater than the fluid pressure acting on the end of the seal.

BRIEF DESCRIPTION OF THE DRAWINGS

FIG. 1 is a cross-sectional view of a high-pressure seal according to the present invention;

FIG. 2 is a cross-sectional view taken along line 2—2 of FIG. 1;

FIG. 3 is a graph illustrating variations of pressure along the length of a seal; and FIG. 4 is a cross-sectional view of a second embodiment of a seal according to the present invention.

DESCRIPTION OF THE PREFERRED EMBODIMENT

Referring to FIGS. 1 and 2, a high-pressure vessel 1 has a side wall 2 and an end wall 3. A shaft 4 extends through an orifice 6 in the end wall 3 from a high-pressure cavity 7 in the high-pressure vessel 1 such that the exterior of the shaft 4 is exposed to a region of low pressure outside the high-pressure cavity 7. A seal 8 according to the invention around the shaft 4 permits the shaft to move axially, as in a pump and rotationally, as in a rotary joint, while controlling leakage around the shaft 4. The present invention provides a predetermined clearance between the seal 8 and the shaft 4 to prevent excessive wear and scoring thereof.

A seal 8 according to the present invention comprises a seal body 9 having a first seal body end 11 with a second seal body end 12 with a passage 13, which may be a cylindrical bore, extending through the seal body 9 between the first and second seal body ends 11 and 12. When the high-pressure cavity 7 is unpressurized, the passage 13 admits the shaft 4 therethrough with a gap 14, which has a predetermined configuration, being provided between the shaft 4 and the seal body 9.

The end wall 3 of the high-pressure vessel 1 includes an annular compression sealing surface 16 on the inner surface thereof around the orifice 6. The diameter of the orifice 6 is preferably substantially greater than that of the passage 13 so that the compression sealing surface 16 engages a compression sealing area 17 being less than the area of the second seal body end 12. When a high fluid pressure exists within the high pressure cavity 7, the pressure along the length of the gap 14 drops from the working pressure inside the high-pressure cavity 7 to the lower pressure, normally atmospheric pressure, which exists in the orifice 6. Therefore, the pressure in the high-pressure cavity 7 forces the seal 8 against the compression sealing surface 16 with a sealing force substantially equal to the product of the gauge pressure inside the high-pressure cavity 7 and the area of the second seal body end 12, which is exposed to the high-pressure fluid within the high-pressure cavity 7. Since the sealing force between the sealing area 17 and the compression sealing surface 16 equals the force on the second seal body end 12, the sealing pressure between the seal 8 and the sealing surface 16 is greater than the pressure within the high-pressure cavity 7.

Still referring to FIGS. 1 and 2, the dimensions of the high-pressure cavity 7 are larger than the corresponding dimensions of the seal 8 so that a gap 18 exists between the inner portion of the side wall 2 of the high-pressure vessel 1 and the seal body 9. High-pressure fluid from the high-pressure cavity 7 fills the gap 18 and compresses the seal body 9 radially inward toward the shaft 4. The sealing pressure, being greater than the pressure inside the high-pressure cavity 7, maintains a seal between the compression sealing area 16 and the sealing portions 17 of the first seal body end 11 for preventing high-pressure fluid in the gap 18 from leaking past the first seal end 11 into the orifice 6.

The gap 14 between the shaft 4 and the seal body 9 has dimensions suitable to prevent contact therebetween at both operating pressure and low ambient pressure to prevent wear and scoring of the shaft 4 and seal 8 while keeping leakage of high-pressure fluid from the high-pressure cavity 7 to the orifice 6 within acceptable limits. Since the pressure in the gap 18 equals the pressure within the high-pressure cavity 7 while the pressure within the gap 14 varies, a pressure differential between the gap 14 and 18 compresses the seal body 9 radially inward toward the shaft 4. The pressure differential along the length of the gap 14 increases from zero at the second seal body end 12 to the gauge pressure within the high-pressure cavity 7 at the first seal body end 11. Therefore, the radial deflection of the seal body 9 continuously increases from zero adjacent the second seal body end 12 to a maximum value at the first seal body end 11.

If the gap 14 had a uniform width over the length L of the seal body 9 during high-pressure operating conditions, the pressure along the length of the seal body 9 would vary linearly as shown in the curve A of FIG. 3, where L is the distance from the first seal body end 11. However, if the gap 14 had an initial uniform width with the high-pressure chamber 7 unpressurized, the gap 14 would not have a uniform width at working pressures since the pressure difference along the length of the gap 14, as described hereinabove, would result in a greater radial deflection at points on the seal body 9 adjacent the first seal body 11 than at points on the seal body 9 adjacent the second seal body end 12. If the gap 14 between the seal body 9 of FIG. 1 and the shaft were uniform with the high-pressure cavity unpressurized, then the pressure distribution along the length of the gap 14 at working pressures within the high-pressure vessel 7 would be a non-linear function as indicated by the curve B in FIG. 3. The shape of the gap 14 controls the velocity of the fluid which leaks therethrough to determine the variation of pressure with distance along the length of the gap 14. The pressure drops rapidly as the gap 14 narrows.

It has been found that a seal 8 according to the present invention is most effective when the distance between the first seal body end 11 and the second seal body end 12 is relatively large and when the gap 14 has uniform width at working pressures. It is possible to achieve the desired uniform width of the gap 14 at working pressures by providing a seal body 9 wherein the passage 13 is non-uniform under low-pressure conditions with the seal body 9 being configured to deform under high-pressure to produce a passage 13 having a substantially uniform gap 14 between the walls of the passage 13 and the shaft 4.

Referring to FIG. 4, there is shown a seal body 19 which has a first seal body end 21 and a second seal body end 22 with the diameter of the second seal body end 22 being substantially less than the diameter of the first seal body end 21 so that the seal body 19 tapers from the wide first seal body end 21 to the narrow seal body end 22. The tapered seal body 19 results in a gap 23 between the seal body 19 and the inner surface of the side wall 2 of the high-pressure cavity 7 which is non-uniform in width when the high-pressure cavity 7 is unpressurized. The seal body 19 has a passage 24 therethrough for admitting the shaft 4, with a substantially uniform gap 26 existing between the walls of the passage 24 and the seal body 19 under unpressurized conditions.

When the high-pressure chamber 7 contains a high-pressure fluid therein, the pressures in the gaps 23 and 26 vary along the length of the seal body 19 as described hereinabove to result in a continuously varying pressure differential along the length of the seal body 19. The first seal body end 21 has a larger diameter than the second seal body end 22; and accordingly, the first seal body end has a greater resistance to radial deformation than does the second seal body end 22. The cross section of the seal body 9 is configured such that the gap 26 narrows uniformly along the length thereof when the seal body 19 is subjected to radially compressive forces from high-pressure fluid within the high-pressure cavity. Therefore, the seal body 19 maintains a substantially uniform gap 26 between the seal body 19 and the shaft 4 at both low pressure and at the working pressure within the high-pressure cavity 7.

Even though the second seal body end 22 has a smaller area than that of the first seal body end 21, the sealing pressure is greater than the fluid pressure within the high-pressure cavity 7. A sealing portion 27, which has an area less than that of the first seal body end 21 sealingly engages the compression sealing surface 16. At each point along the surface of the seal body 19, the force thereon due to the fluid pressure within the high-pressure cavity 7 is perpendicular to the surface of the seal body 19. The fluid forces on the seal body 19 may be resolved into axial and radial components, with the radial component acting to radially deflect the seal body 19 toward the shaft 4 while the axial component provides the sealing force. Since it is difficult to control the gap between the seal body 19 and the shaft 4 under the wide range of pressures which may exist within the high-pressure cavity 7, it is desirable to maintain the gap 26 as large as possible without incurring excessive leakage to reduce the criticality of manufacturing tolerance.

The seal body 19 results in a seal which has the desired characteristics of being relatively long and maintaining a gap 26 of uniform width under both unpressurized and high-pressure conditions within the high-pressure cavity 7. Factors which determine the optimum shape of the seal body 19 include changes in the configuration of the shaft 4 under axial forces and radial forces and changes in configuration of the seal body due to axial and radial loading. A seal according to the invention may be constructed of any suitable material, such as stainless steel.

The present invention provides a seal which is particularly useful in rotary joints with the high-pressure cavity 7 containing water at pressures up to 60,000 psi. It is theorized that under such conditions, the presence of fluid within the gap 26 while the shaft 4 spins within the passage 24 results in a hydrodynamic lubricating effect similar to that which occurs in journal bearings. In reciprocating applications, a lubricant may be required to prevent excessive wear on the shaft 4 and the surface of the passage 24.

Although the present invention has been described with reference to a particular embodiment thereof, it will be understood by those skilled in the art that modifications may be made without departing from the scope of the invention. Accordingly, all modifications and equivalents which are properly within the scope of the appended claims are included in the present invention.

What is claimed is:

1. A seal for a shaft extending between high pressure and low pressure regions, comprising: a seal body for surrounding said shaft with a gap of predetermined configuration between said seal body and said shaft under non-pressurized conditions and extending from said high pressure region to said low pressure region, the exterior of said seal body being subjected to the fluid pressure within said high pressure region acting radially thereon; and means for controlling the radial compressive deformation of said seal body along the length thereof to provide a predetermined clearance between said seal body and said shaft under pressurized conditions to control leakage of said high-pressure fluid.

2. A seal for controlling leakage about a shaft which extends from a high pressure region to a low pressure region, comprising:
a seal body which is compressible by the high pressure in the high fluid pressure region, said seal body having an exterior sidewall exposed to the fluid pressure in said high fluid pressure region, and a passage there through, said passage extending from the high fluid pressure region to the low fluid pressure region for admitting the shaft there through for providing a predetermined clearance between said passage and the shaft under pressurized conditions.

3. A seal according to claim 2 further comprising a first seal body end having a compression sealing area for engaging a compression sealing surface between the high fluid pressure region and the low fluid pressure region.

4. A seal according to claim 3 further comprising a second seal body end and wherein said compression sealing area is less than the area of said second seal body end, whereby application of pressure to said second seal body ends forms a sealing pressure on said compression sealing area, said sealing pressure being greater than the pressure applied to said second seal body end.

5. A seal according to claim 2 wherein the wall of the passage is spaced from the shaft with a predetermined clearance when the fluid pressure compresses the seal body about the shaft.

6. A seal according to claim 5 wherein said predetermined clearance between said passage wall and said shaft is a gap having uniform width along the length of said passage.

7. A seal according to claim 6 wherein the external configuration of said seal body comprises a truncated cone.

8. A seal according to claim 5 wherein said clearance has uniform width at atmospheric pressure and said seal body has a tapered configuration with the wider end of the seal body being closest to said low fluid pressure region, whereby said seal body is radially compressed to uniformly reduce the width of said clearance.

9. A seal according to claim 5 wherein the cross-sectional area of the seal body varies along its length.

10. A seal body according to claim 5 wherein said exterior side wall of said seal body has a configuration which provides resistance to compressive deformation which varies along the length of the seal body in a predetermined manner.

11. A seal according to claim 5 wherein the seal body comprises a material having a predetermined compressibility.

12. A seal for a shaft as in claim 2 wherein the length of said clearance is greater than the greatest distance between the exterior of said body and the interior of said body.

13. A seal for a shaft as in claim 2 wherein said predetermined clearance is never zero.

14. A seal for a shaft extending through an orifice in a wall of a high pressure vessel to a low pressure region, comprising:
a sealing surface around said orifice; and
a sealing body surrounding said shaft with a gap of predetermined configuration therebetween under non-pressurized conditions and extending from the interior of said high pressure vessel to said low pressure region, said seal body having a compression sealing area engaged with said sealing surface under pressurized conditions, the fluid pressure within said high pressure vessel exerting radial and axial compressive forces on said seal body, said axial compressive force acting on an area of said seal body within said high pressure vessel greater than said compression sealing area to form a sealing pressure between said compression sealing area and said sealing surface, said sealing pressure being greater than the pressure within said high pressure vessel, said radial compressive force radially deforming said seal body to provide a predetermined clearance between said seal body and said shaft along the length of said gap.

15. A seal as in claim 14 wherein said gap is longer than the greatest distance between the interior and the exterior of said seal's body.

16. A seal as in claim 14 wherein said gap is never zero.

17. A method for sealing an operating shaft extending between high pressure and low pressure regions comprising the steps of:
surrounding said shaft with a deformable seal body having a predetermined gap between said shaft and said seal body;
subjecting the exterior of said seal body to high pressure whereby said seal body is radially compressed about said shaft; and
controlling the resistance to compressive deformation of said seal body to provide a predetermined clearance between said seal body and said shaft at operating pressure.

18. A method for sealing according to claim 17 wherein the controlling of the resistance to compressive deformation of the seal body includes the step of selecting an exterior configuration for said seal body which will provide the desired predetermined clearance.

19. A method for sealing according to claim 17 wherein the controlling of the resistance to compressive deformation of the seal body includes the step of selecting a material for sadi seal body of a desired compressibility.

20. A method for sealing according to claim 17 wherein said predetermined gap is of finite value greater than zero.

21. A method for sealing according to claim 17 wherein said gap is longer than the greatest distance between the exterior and the interior of said body.

* * * * *